(12) United States Patent
Lu (10) Patent No.: US 12,274,237 B2
(45) Date of Patent: Apr. 15, 2025

(54) SECURING MECHANISM AND PET LOADING ACCESSORY USING THE SECURING MECHANISM

(71) Applicant: XIAMEN SUNNYPET PRODUCTS CO., LTD, Xiamen (CN)

(72) Inventor: Kongzhi Lu, Xiamen (CN)

(73) Assignee: XIAMEN SUNNYPET PRODUCTS CO., LTD, Xiamen (CN)

( * ) Notice: Subject to any disclaimer, the term of this patent is extended or adjusted under 35 U.S.C. 154(b) by 0 days.

(21) Appl. No.: 18/208,396

(22) Filed: Jun. 12, 2023

(65) Prior Publication Data

US 2024/0324548 A1 Oct. 3, 2024

(30) Foreign Application Priority Data

Mar. 29, 2023 (CN) .......................... 202320656890.6

(51) Int. Cl.
*B60R 22/10* (2006.01)
*A01K 1/02* (2006.01)
*B60R 22/18* (2006.01)

(52) U.S. Cl.
CPC ............ *A01K 1/0272* (2013.01); *B60R 22/10* (2013.01); *B60R 22/18* (2013.01); *B60R 2022/1818* (2013.01)

(58) Field of Classification Search
CPC ...... A01K 1/0272; B60R 22/10; B60R 22/18; B60R 22/20; B60R 22/26; B60R 2022/1818; B60R 2022/181802
See application file for complete search history.

(56) References Cited

U.S. PATENT DOCUMENTS

| 6,669,302 | B2 * | 12/2003 | Warner .................. B60R 22/30 |
| | | | 297/483 |
| D804,738 | S | 12/2017 | Nourollah |
| 9,849,838 | B1 | 12/2017 | Siciliano |

(Continued)

FOREIGN PATENT DOCUMENTS

| CN | 204020804 U | 12/2014 |
| CN | 206284082 U | 6/2017 |

(Continued)

*Primary Examiner* — Joshua J Michener
*Assistant Examiner* — Henry Hooper Mudd
(74) *Attorney, Agent, or Firm* — Bayramoglu Law Offices LLC (57) ABSTRACT

A securing mechanism and a pet loading accessory using the securing mechanism are provided. The securing mechanism includes a base, a first blocking portion, and a second blocking portion. The base is provided with a through hole. The first blocking portion and the second blocking portion are configured into an L-shaped bending structure or a U-shaped structure. The base, the first blocking portion, and the second blocking portion form a securing groove for accommodating and constraining a strip-shaped object. A communication gap that communicates with the securing groove is formed between the tail ends of the first blocking portion and the second blocking portion. By using the securing mechanism of the present disclosure, the safety belt of a vehicle can be reliably secured by the securing mechanism without much manual operation, thus the pet loading accessory can be firmly secured on the vehicle seat.

7 Claims, 10 Drawing Sheets

(56) References Cited

U.S. PATENT DOCUMENTS

| | | | |
|---|---|---|---|
| 10,589,865 B2 * | 3/2020 | Orders | B64D 11/06 |
| 10,772,288 B1 | 9/2020 | Sandiford | |
| 2010/0000472 A1 | 1/2010 | Siklosi | |
| 2010/0301594 A1 * | 12/2010 | Hathaway | B60R 22/26 |
| | | | 280/808 |
| 2016/0057968 A1 | 3/2016 | Chandler et al. | |
| 2017/0369029 A1 * | 12/2017 | Loew | B60R 22/20 |
| 2018/0015904 A1 * | 1/2018 | Loew | B60R 22/26 |
| | | | 60/26 |
| 2021/0259199 A1 | 8/2021 | Lin et al. | |
| 2023/0166686 A1 * | 6/2023 | Ozcan | B60R 22/26 |

FOREIGN PATENT DOCUMENTS

| | | |
|---|---|---|
| CN | 208657611 U | 3/2019 |
| JP | 2005348700 A | 12/2005 |

\* cited by examiner

SECURING MECHANISM AND PET LOADING ACCESSORY USING THE SECURING MECHANISM

TECHNICAL FIELD

The present disclosure relates to the technical field of pet products, and more specifically, to a securing mechanism and a pet loading accessory using the securing mechanism.

BACKGROUND

Pet loading accessories, such as pet carriers and pet sofas, are commonly used to load and carry pets. In addition to the loading and carrying function, sometimes it is also necessary to place the pet loading accessories on the seats of vehicles to meet the needs of transporting pets in vehicles.

When a pet loading accessory is placed on the seat of a vehicle for transportation, it is important to secure the pet loading accessory relative to the seat so that the pet loading accessory will not fall off the seat or move on the seat during the vehicle's movement. To realize the fixation, a strap-like structure is usually used and connected to the seat belt to secure the pet loading accessory. However, the use of a strap-like structure to secure the pet loading accessory does not always provide a reliable securing effect due to the softness and flexibility of the seat belt and the strap-like structure. There are also some mechanical structures that are used for securing the pet loading accessory, such as a rotating arm assembly that is pivotally mounted on an axis to connect and disconnect the pet loading accessory to the seat belt. However, the design of such assembly is complex and expensive due to the presence of several structures and the inconvenience of operation.

Therefore, it is of great significance to develop a securing mechanism that has a simple structure and is convenient for operation and highly reliable for securing a pet loading accessory.

SUMMARY

In view of the deficiencies in the prior art, the present disclosure provides a securing mechanism and a pet loading accessory using the securing mechanism.

On a first aspect, a securing mechanism for a pet loading accessory includes a base, a first blocking portion, and a second blocking portion. The base is provided with a through hole.

Further, the first blocking portion incudes a substantially horizontal segment and a substantially vertical segment. The first end of the substantially horizontal segment of the first blocking portion is fixedly connected to the base, and the second end of the substantially horizontal segment of the first blocking portion is integrally formed with the first end of the substantially vertical segment of the first blocking portion to form a first joint and configure the first blocking portion in an L-shaped bending structure. The second blocking portion includes a substantially horizontal segment and a substantially vertical segment. The first end of the substantially horizontal segment of the second blocking portion is fixedly connected to the base, and the second end of the substantially horizontal segment of the second blocking portion is integrally formed with the first end of the substantially vertical segment of the second blocking portion to form a second joint and configure the second blocking portion in an L-shaped bending structure. The second end of the substantially vertical segment of the first blocking portion and the second end of the substantially vertical segment of the second blocking portion are arranged apart from and opposite to each other in an approaching manner.

Further, a securing groove is formed between the first blocking portion, the second blocking portion, and the base, and a communication gap communicating with the securing groove is formed between the second end of the substantially vertical segment of the first blocking portion and the second end of the substantially vertical segment of the second blocking portion.

Further, the length of the substantially vertical segment of the first blocking portion is greater than, equal to, or less than the length of the substantially vertical segment of the second blocking portion.

Further, the substantially vertical segment of the first blocking portion and the substantially vertical segment of the second blocking portion are both arranged parallel to the base.

Further, the base is provided with two bolt holes.

Further, the second end of the substantially vertical segment of the first blocking portion is parallel to the substantially horizontal segment of the first blocking portion, and the second end of the substantially vertical segment of the second blocking portion is parallel to the substantially horizontal segment of the second blocking portion. The surface of the second end of the substantially vertical segment of the first blocking portion is a rounded surface, and the surface of the second end of the substantially vertical segment of the second blocking portion is an inclined surface tilted towards the securing groove. Alternatively, the surface of the second end of the substantially vertical segment of the first blocking portion is an inclined surface tilted towards the securing groove, and the surface of the second end of the substantially vertical segment of the second blocking portion is a rounded surface.

Further, the second end of the substantially vertical segment of the first blocking portion is parallel or oblique with respect to the substantially horizontal segment of the first blocking portion, and the second end of the substantially vertical segment of the second blocking portion is parallel or oblique with respect to the substantially horizontal segment of the second blocking portion.

Further, the securing mechanism includes a closed sliding sleeve slidably sleeved on the substantially vertical segment of the first blocking portion, and the closed sliding sleeve is provided with a card slot. The second blocking portion is provided with a card hook, and the card hook is fixedly provided at the second end of the substantially vertical segment of the second blocking portion. When the closed sliding sleeve slides along the substantially vertical segment of the first blocking portion to close the communication gap, the card hook is inserted into and engaged with the card slot.

On a second aspect, a securing mechanism for a pet loading accessory includes a base, a first blocking portion, and a second blocking portion. The first blocking portion and the second blocking portion are in a staggered configuration.

Further, the first blocking portion includes a substantially U-shaped segment and a substantially vertical segment. The first end of the substantially U-shaped segment of the first blocking portion is fixedly connected to the base, and the second end of the substantially U-shaped segment of the first blocking portion is integrally formed with the first end of the substantially vertical segment of the first blocking portion to form a first joint and configure the first blocking portion in a hook-like shape. The second blocking portion includes a substantially U-shaped segment and a substantially vertical segment. The first end of the substantially U-shaped segment of the second blocking portion is fixedly connected to the base, and the second end of the substantially U-shaped segment of the second blocking portion is integrally formed with the first end of the substantially vertical segment of the second blocking portion to form a second joint and configure the second blocking portion in a hook-like shape. The second end of the substantially vertical segment of the first blocking portion and the second end of the substantially vertical segment of the second blocking portion are arranged in the staggered configuration in an approaching manner.

Further, a securing groove is formed between the first blocking portion, the second blocking portion, and the base, and a communication gap communicating with the securing groove is formed between the second end of the substantially vertical segment of the first blocking portion and the second end of the substantially vertical segment of the second blocking portion.

Further, before the second end of the substantially vertical segment of the first blocking portion and the second end of the substantially vertical segment of the second blocking portion contact, at least one of the second end of the substantially vertical segment of the first blocking portion and the second end of the substantially vertical segment of the second blocking portion turns away to achieve the staggered configuration.

Further, a protrusion is provided on the substantially vertical segment of the first blocking portion and set inside the securing groove.

Further, the protrusion is a convex ridge structure protruding from the side facing the base and adjacent to the second end of the second blocking portion.

On a third aspect, a securing mechanism for a pet loading accessory includes a body. The body includes a fixing end and a movable end, the fixing end is fixedly connected to the pet loading accessory, and the movable end is detachably connected to the pet loading accessory. The body is made of a flexible and non-elastic material. The use of flexible and non-elastic material can reduce the relative movement between the securing mechanism and the safety belt of a vehicle during use and enhance the securing effect of the securing mechanism on the safety belt.

Further, the fixing end is fixedly connected to the pet loading accessory by an adhesive, a suture, or the like. Alternatively, the fixing end is integrally formed with pet loading accessory. The movable end is detachably connected to the pet loading accessory by a hook or a loop fastener, a button, or the like.

On a fourth aspect, the present disclosure provides a pet loading accessory using any of the above securing mechanism.

Compared with the prior art, the present disclosure has the following advantages:

1. The securing mechanism provided by the present disclosure allows the easy access of the safety belt of a vehicle into its accommodating groove/space through a communication gap or a detachable element such as a hook or a loop fastener or a button, thus reducing manual operation and increasing convenience.

2. The base of the securing mechanism provided by the present disclosure is designed with a through hole, which facilitates the demolding of the securing mechanism from a molding die when the securing mechanism is an integrally molded structure and also saves injection molding materials.

3. The securing mechanism provided by the present disclosure has two blocking portions configured in an L-shaped bending structure or a hook-like structure adjacent and opposite to each other, which form a groove with the base to receive the safety belt of a vehicle. The length of the two blocking portions and the width of the safety belt can be adjusted to ensure the part of the safety belt inside the groove not to escape from the groove accidentally, thus achieving a highly reliable securing effect of the securing mechanism on the pet loading accessory.

4. The two blocking portions of the securing mechanism provided by the present disclosure are additionally provided with a card hook and a closed sliding sleeve with a card slot, when in use, the closed sliding sleeve slides to enable the card slot to be engaged with the card hook, such that the communication gap left between the two blocking portions are completely closed and the part of the safety belt inside the groove can never slip out, further enhancing securing effect of the securing mechanism on the pet loading accessory.

5. One blocking portion of the securing mechanism provided by the present disclosure is additionally provided with a protrusion which can further prevent the part of the safety belt inside the groove from slipping out of the groove, thus improving the securing effect of the securing mechanism on the pet loading accessory.

6. The two blocking portions of the securing mechanism provided by the present disclosure can be arranged in a staggered configuration with the tail ends thereof staggered, which is also conducive to preventing the part of the safety belt inside the groove from slipping out of the groove.

7. The use of flexible and non-elastic material to fabricate the securing mechanism can reduce the relative movement between the securing mechanism and the safety belt when the two cooperate to secure the pet loading accessory, thus improving the securing effect of the securing mechanism on the pet loading accessory.

Figure 1:
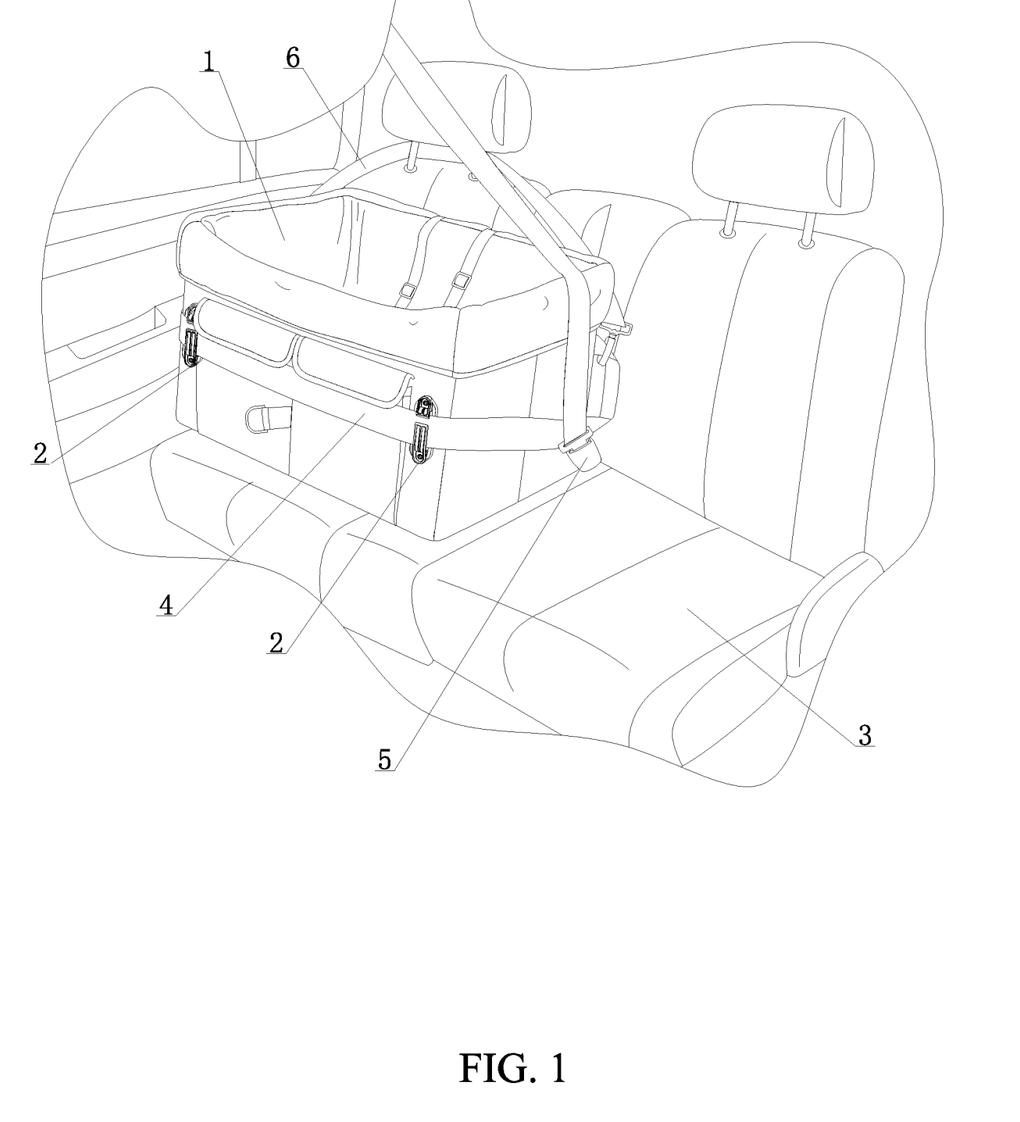
FIG. 1 is a schematic diagram showing the pet loading accessory according to embodiment 1 of the present disclosure when being placed and fixed on a vehicle seat.

REFERENCE NUMBER IN THE FIGURES 1. loading body, 2. securing mechanism, 3. vehicle seat, 4. safety belt, 5. safety belt buckle, 6. webbing structure; 20. communication gap;
21. base, 211. through hole, 212. bolt hole;

22. first blocking portion, 220. securing groove, 221. substantially horizontal segment, 222. substantially vertical segment, 223. protrusion, 22a. front end, 22b. joint, 22c. rear end;
23. second blocking portion, 231. substantially horizontal segment, 232. substantially vertical segment, 233. card hook, 23a. front end, 23b. joint, 23c. rear end;
24. closed sliding sleeve, 241 card slot;
25. body, 25a. fixing end, 25b. movable end;
26. hook or loop fastener;
27. button.

DETAILED DESCRIPTION OF THE EMBODIMENTS

Specific embodiments of the present disclosure will be described with reference to the drawings hereinafter.

Embodiment 1

Referring to FIG. 1, a pet loading accessory includes the loading body 1 and the securing mechanism 2. The securing mechanism 2 is arranged on the outer edge of the loading body 1 and is used for securing the pet loading accessory with a strap-like body used for securing. The securing mechanism 2 can be placed at any position of the loading body 1 as required. The securing mechanism 2 can be a fitting attached to the loading body 1 or a structure integrally formed with the loading body 1.

Specifically, the types of the pet loading accessory include a pet sofa, a pet carrier, a pet transport box with vehicle functions, etc. In the present embodiment, a pet sofa that can be carried in a vehicle is used as an example for illustration. In FIG. 1, the pet loading accessory is placed on the vehicle seat 3. The three-point safety belt 4 of the vehicle seat 3 is inserted into the safety belt buckle 5 and is in a roughly horizontal position, which is the strap-like body mentioned above. The securing mechanism 2 is used to secure the pet loading accessory by cooperating with the roughly horizontal section of the three-point safety belt 4, so that the loading body 1 is secured by the retraction force of the three-point safety belt 4 during normal use and by the cooperation of the securing mechanism 2 and the three-point safety belt 4 being locked in the case of an emergency. When the pet loading accessory is in the state of being placed on the vehicle seat 3, the side of the peripheral edge of the pet loading accessory facing the direction of vehicle travel is defined as the front side of the loading body 1. To further improve the cooperative effect between the securing mechanism 2 and the three-point safety belt 4, two or more securing mechanisms 2 can be used. In the present embodiment, two securing mechanisms 2 are used and respectively arranged on the front side of the loading body 1, and the two securing mechanisms 2 are set at approximately the same height. The securing mechanism 2 is an independently manufactured element, which is locked on the front side of the loading body 1 by screws or similar fastening members. In the present embodiment, the pet loading accessory is also secured by the webbing structure 6 hung on the headrest of the vehicle seat 3.

Figure 2:
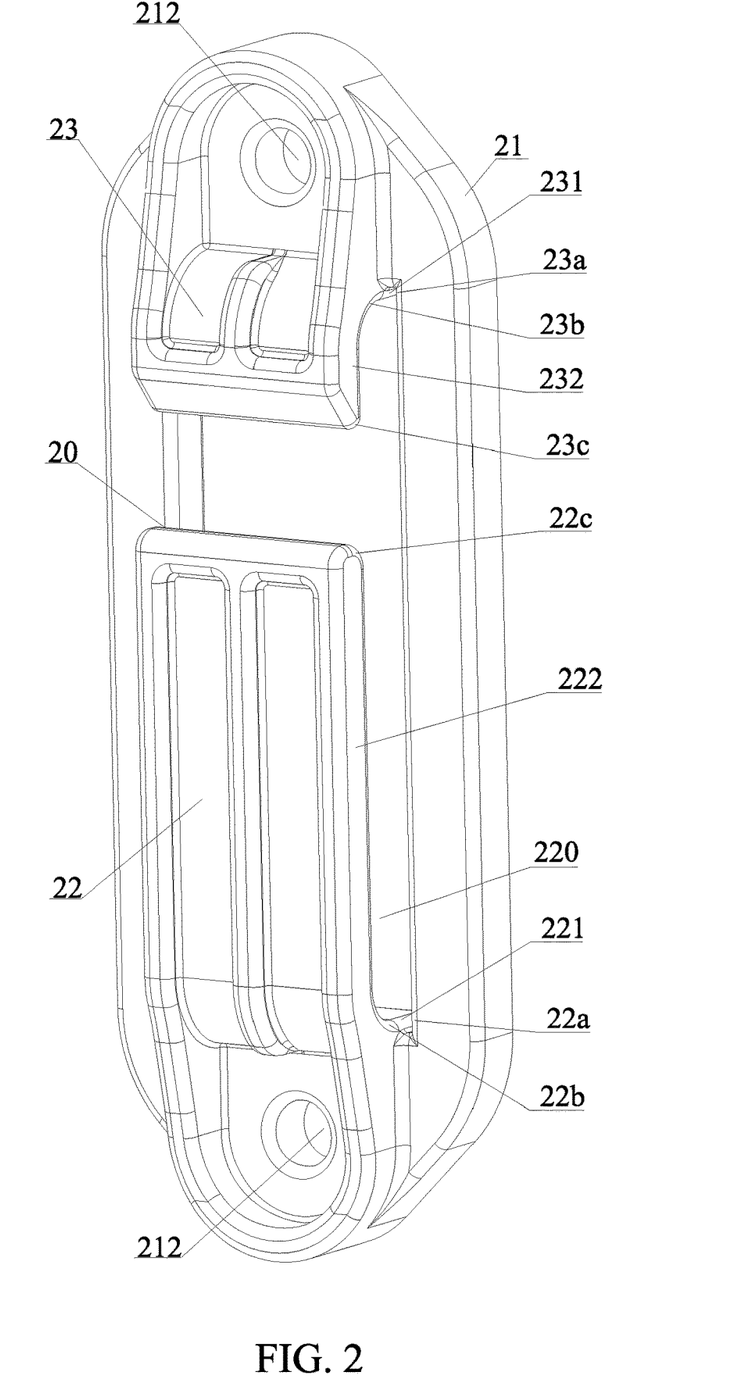
FIG. 2 is a schematic diagram of the securing mechanism shown in FIG. 1.
Figure 3:
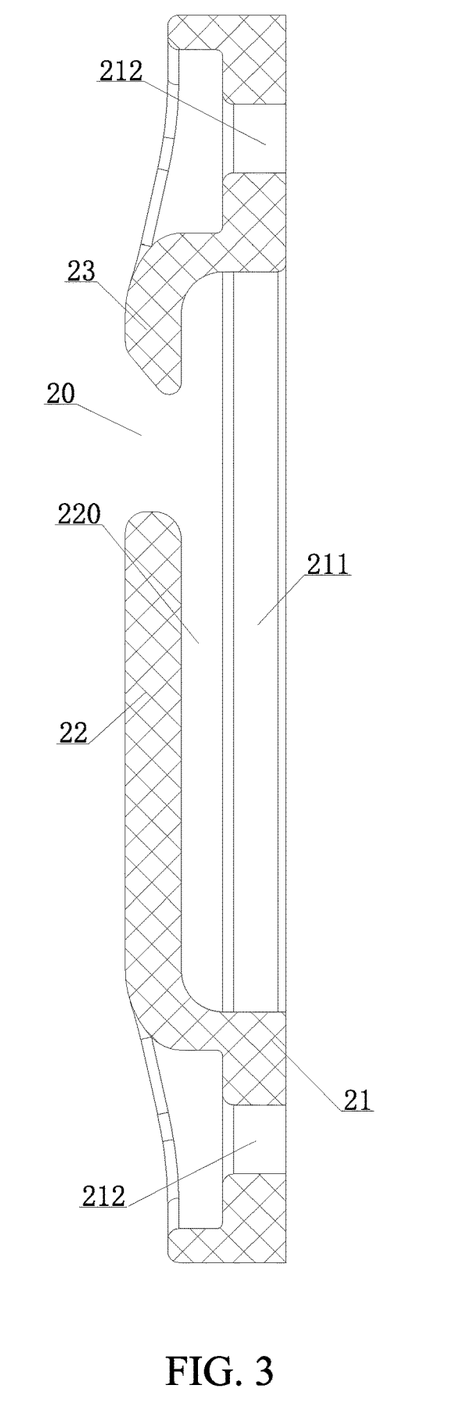
FIG. 3 is a semi-sectional schematic diagram of the securing mechanism shown in FIG. 2.

Referring to FIG. 2 to FIG. 3, the securing mechanism 2 includes the base 21, the first blocking portion 22, and the second blocking portion 23. The first blocking portion 22 and the second blocking portion 23 are configured in an L-shaped bending structure. The first blocking portion 22 has the substantially horizontal segment 221 and the substantially vertical segment 222 that are connected to configure the first blocking portion 22 in the L shape. The front end 22a of the first blocking portion 22 is fixedly arranged on the base 21, the substantially horizontal segment 221 is formed by extending outwardly from the front end 22a to the joint 22b of the first blocking portion 22, and the substantially vertical segment 222 is formed by extending from the joint 22b to the rear end 22c of the first blocking portion 22. The substantially vertical segment 222 is parallel to and spaced apart from the base 21, and the parallel arrangement can be roughly parallel or slightly inclined relative to the base 21. The second blocking portion 23 has the substantially horizontal segment 231 and the substantially vertical segment 232 that are connected to configure the first blocking portion 23 in an L-shaped bending structure. The front end 23a of the second blocking portion 23 is fixedly arranged on the base 21, the substantially horizontal segment 231 is formed by extending outwardly from the front end 23a to the joint 23b of the second blocking portion 23, and the substantially vertical segment 232 is formed by extending from the joint 23b to the rear end 23c of the second blocking portion 23. The substantially vertical segment 232 is parallel to and spaced apart from the base 21, and the parallel arrangement can be roughly parallel or slightly inclined relative to the base 21. The rear end 22c of the first blocking portion 22 and the rear end 23c of the second blocking portion 23 are arranged apart from and opposite to each other in an approaching manner. The securing groove 220 is formed between the bending structure of the first blocking portion 22, the bending structure of the second blocking portion 23, and the base 21. The communication gap 20 communicating with the securing groove 220 is formed between the rear end 22c of the first blocking portion 22 and the rear end 23c of the second blocking portion 23.

The length of the substantially vertical segment 222 of the first blocking portion 22 and the length of the substantially vertical segment 232 of the second blocking portion 23 can be adjusted as needed. The length of the substantially vertical segment 222 can be greater than, equal to, or less than that of the substantially vertical segment 232. In the present embodiment, the length of the substantially vertical segment 222 is greater than that of the substantially vertical segment 232.

Preferably, the middle and lower part of the securing groove 220, which is the space formed between the bending structure of the first blocking portion 22 and the base 21, is mainly used to accommodate the roughly horizontal section of the three-point seat belt 4. The second blocking portion 23 mainly cooperates with the first blocking portion 22 to prevent the roughly horizontal section of the three-point seat belt 4 from slipping out from the top of the first blocking portion 22. Therefore, the length of the substantially vertical segment 222 of the first blocking portion 22 is set to be greater than that of the substantially vertical segment 232 of the second blocking portion 23.

The first blocking portion 22 and the second blocking portion 23 are both in a bent plate structure. The base 21 is in a strip plate structure. The substantially vertical segment 222 and the substantially vertical segment 232 are both arranged parallel to the base 21. The base 21, the first blocking portion 22, and the second blocking portion 23 are integrally molded. The base 21 is provided with the through hole 211 and two bolt holes 212. The shape of the through hole 211 and the bolt holes 212 can be selected as needed. In the present embodiment, the through hole 211 is square and the bolt holes are circular. The square through hole 211 and the bolt holes 212 penetrate the thickness direction of the base 21, and the square through hole 211 is located in the middle of the base 21 and is connected to the front end 22a of the first blocking portion 22 and the front end 23a of the second blocking portion 23. The square through hole 211 is connected to the securing groove 220. The two bolt holes 212 are located at two ends of the base 21, respectively. Since the securing mechanism 2 is an integrally molded structure, the setting of the square through hole 211 can facilitate the demolding of the securing mechanism 2 from a molding die and also save injection molding materials.

Referring to FIG. 1 to FIG. 3, the securing mechanism 2 can be secured in place by inserting and fastening bolts into the bolt holes 212. Specifically, since the securing groove 220 is used to hold and constrain the roughly horizontal section of the three-point safety belt 4 to secure the pet loading accessory, it is preferred that the first blocking portion 22 is located below the second blocking portion 23. The substantially vertical segment 222 of the first blocking portion 22 is longer that the substantially vertical segment 232 of the second blocking portion 23, which allows over half of the securing groove 220 to be used to safely accommodate the roughly horizontal section of the three-point safety belt 4. The securing mechanism 2 is secured by bolts with the back of the base 21 in contact with the loading body 1 of the pet loading accessory. To facilitate the entry of the roughly horizontal section of the three-point safety belt 4 into the securing groove 220 through the communication gap 20, it is preferred that the surface of the rear end 22c of the first blocking portion 22 and the surface of the rear end 23c of the second blocking portion 23 are designed as rounded surfaces or inclined surfaces tilted towards the location of the securing groove 220. In the present embodiment, as shown in FIG. 2 and FIG. 3, the surface of the rear end 22c of the first blocking portion 22 is designed as a rounded surface and the surface of the rear end 23c of the second blocking portion 23 is designed as an inclined surface.

To prevent the roughly horizontal section of the three-point safety belt 4 from slipping out through the communication gap 20 during use and improve the stability of the fixation of the pet loading accessory, the width of the roughly horizontal section of the three-point safety belt 4 is greater than the distance between the joint 22b of the first blocking portion 22 and the lowest point of the rear end 23c of the second blocking portion 23, but less than the distance between the joint 22b of the first blocking portion 22 and the joint 23b of the second blocking portion 23. Preferably, the width of the roughly horizontal section of the three-point safety belt 4 is at least 10 mm greater than the distance between the joint 22b of the first blocking portion 22 and the lowest point of the rear end 23b of the second blocking portion 23. Since, in the present embodiment, the projection of the communication gap 20 on the base 21 is roughly perpendicular to the length direction of the base 21, that is, the rear end 22c of the first blocking portion 22 and the rear end 23c of the second blocking portion 23 are both perpendicular to the length direction of the base 21, the distance between the joint 22b of the first blocking portion 22 and the lowest point of the rear end 23c of the second blocking portion 23 actually refers to the distance between the joint 22b of the first blocking portion 22 and the rear end 23c of the second blocking portion 23.

Embodiment 2

Figure 4:
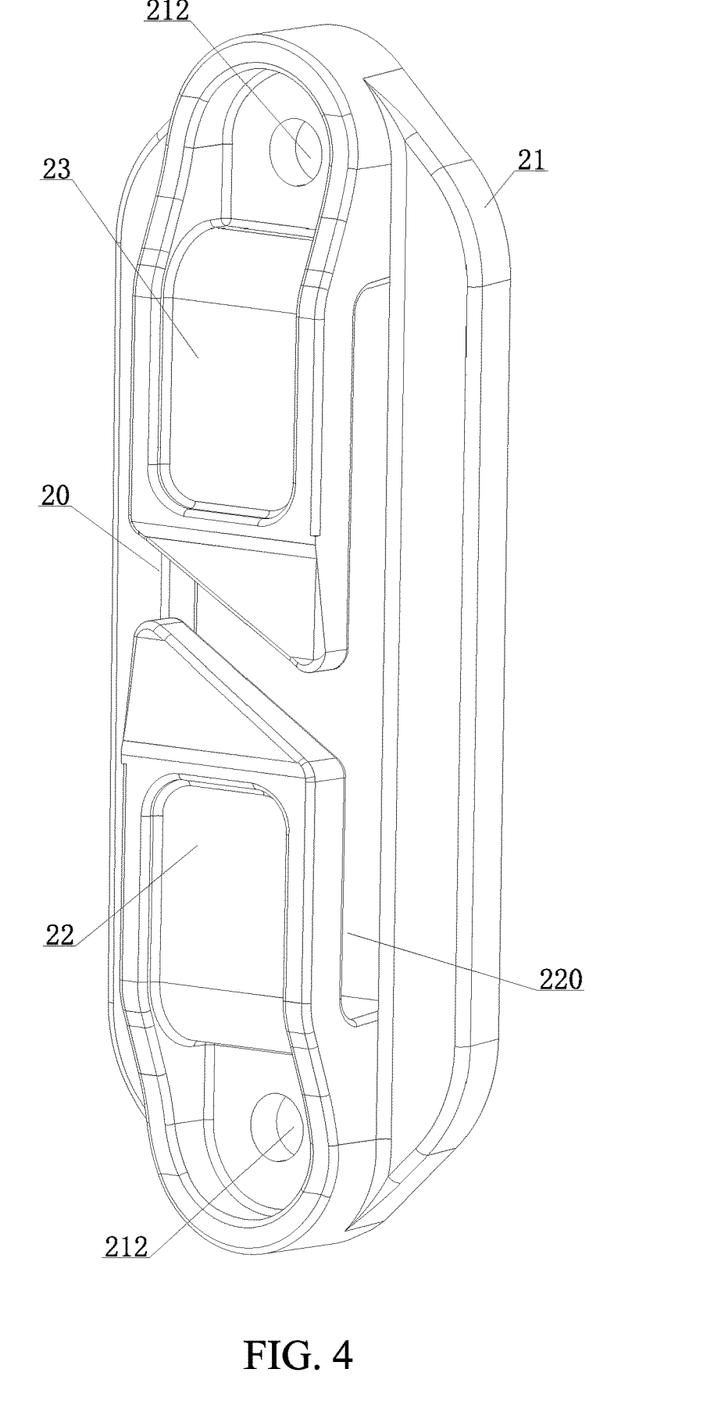
FIG. 4 is a schematic diagram of the securing mechanism according to embodiment 2 of the present disclosure.

Referring to FIG. 4, the main differences between embodiment 2 and embodiment 1 are as follows:

1. In embodiment 1, the length of the substantially vertical segment 222 of the first blocking portion 22 is greater than the length of the substantially vertical segment 232 of the second blocking portion 23, while in the present embodiment, the length of the substantially vertical segment 222 of the first blocking portion 22 is equal to the length of the substantially vertical segment 232 of the second blocking portion 23.

The length of the substantially vertical segment 222 of the first blocking portion 22 is equal to the length of the substantially vertical segment 232 of the second blocking portion 23, and the width of the roughly horizontal section of the three-point safety belt 4 itself is greater than the distance between the joint 22b of the first blocking portion 22 and the lowest point of the rear end 23c of the second blocking portion 23, as a result, nearly half of the roughly horizontal section of the three-point safety belt 4 enters the cavity formed by the bending structure of the second blocking portion 23 and the base 21. In fact, the expression of the first blocking portion 22 and the second blocking portion 23 is for the ease of differentiation, and they can be configured in the same structure or different structures. Moreover, those skilled in the art can easily set up alternative ways, such as the length of the substantially vertical segment 222 of the first blocking portion 22 being smaller than the length of the substantially vertical segment 232 of the second blocking portion 23.

2. In embodiment 1, the rear end 22c of the first blocking portion 22 and the rear end 23c of the second blocking portion 23 are roughly perpendicular to the vertical direction, i.e., the projection of the communication gap 20 on the base 21 is roughly perpendicular to the length direction of the base 21, while in the present embodiment, the rear end 22c of the first blocking portion 22 and the rear end 23c of the second blocking portion 23 are set to be relatively oblique with respect to the vertical direction.

Embodiment 3

Figure 5:
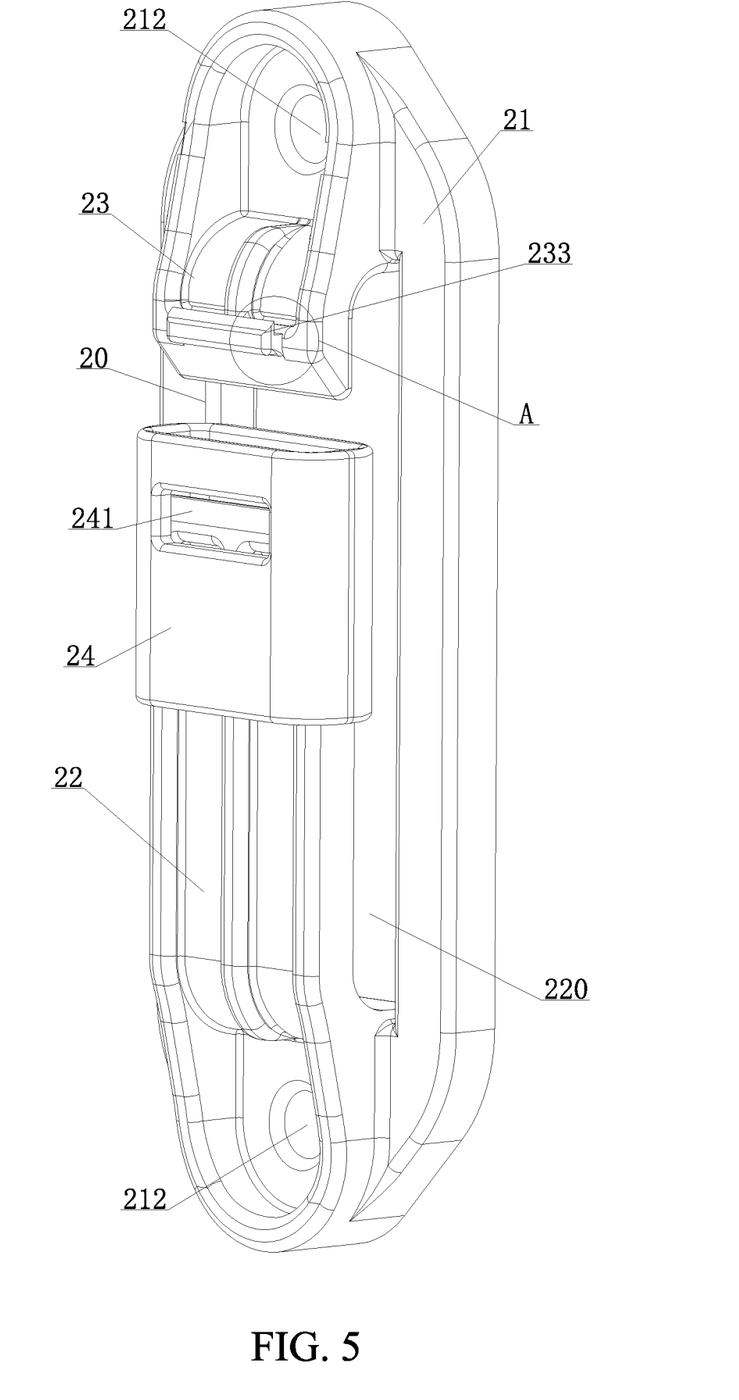
FIG. 5 is a schematic diagram of the securing mechanism according to embodiment 3 of the present disclosure.
Figure 6:
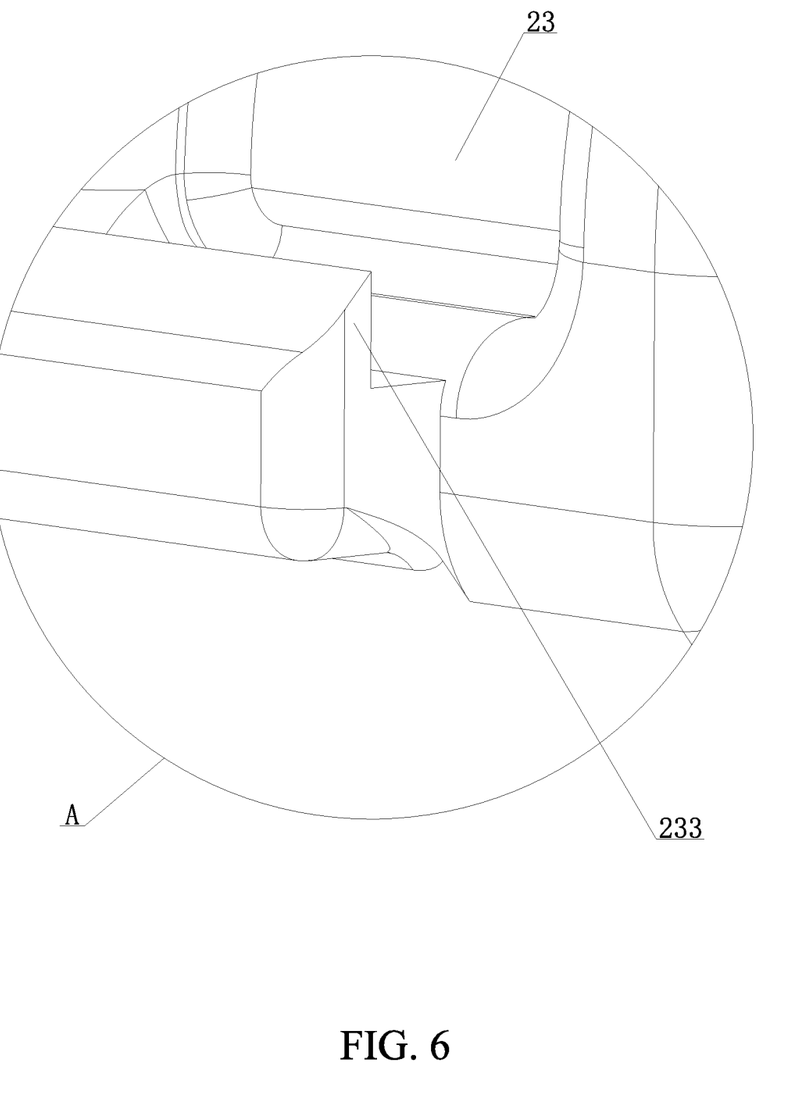
FIG. 6 is an enlarged view showing the Part A in FIG. 5.

Referring to FIG. 5 to FIG. 6, the securing mechanism 2 for a pet loading accessory which is identical to the pet loading accessory in embodiment 1 is provided. The securing mechanism 2 includes the base 21, the first blocking portion 22, the second blocking portion 23, and the closed sliding sleeve 24. The first blocking portion 22 and the second blocking portion 23 both have a bending plate-like structure extending along an L shape, while the base 21 has a strip-shaped plate-like structure. The securing mechanism 2 is integrally formed by an injection molding. The base 21 and the first blocking portion 22 are identical to the base 21 and the first blocking portion 22 in embodiment 1, and the second blocking portion 23 differs from the second blocking portion 23 in embodiment 1 only in that the card hook 233 is further provided on the second blocking portion 23. The closed sliding sleeve 24 is slidably sleeved on the outside of the first blocking portion 22. Alternatively, the card hook can be provided on the closed sliding sleeve and the card slot can be provided on the second blocking portion. The closed sliding sleeve 24 is used to close the communication gap 20. Since the length of the substantially vertical segment 222 of the first blocking portion 22 is greater than that of the substantially vertical segment 232 of the second blocking portion 23, the closed sliding sleeve 24 is preferably slidably sleeved on the substantially vertical segment 222 of the first blocking portion 22. In the present embodiment, since the communication gap 20 can be closed by the closed sliding sleeve 24, when the securing mechanism 2 is assembled to the outer edge of the loading body 1, it can be applied well regardless of whether the first blocking portion 22 is above or below the second blocking portion 23. When the first blocking portion 22 is above the second blocking portion 23, the closed sliding sleeve 24 can maintain the closure of the communication gap 20 due to gravity, so no other structure is needed between the closed sliding sleeve 24 and the rear end 23*c* of the second blocking portion 23.

Referring to FIG. 5 to FIG. 6, the present embodiment further describes the process closing the communication gap 20 when the securing mechanism 2 is assembled to the front side of the loading body 1 with the first blocking portion 22 arranged below the second blocking portion 23. The second blocking portion 23 is provided with the card hook 233, which is fixedly arranged at the rear end 23*c* of the second blocking portion 23. The closed sliding sleeve 24 is provided with the card slot 241, which is matched with the card hook 233. When the closed sliding sleeve 24 slides along the substantially vertical segment 222 of the first blocking portion 22 to close the communication gap 20, the card hook 233 is inserted into and engaged with the card slot 241 to avoid the closed sliding sleeve 24 from sliding off due to gravity.

Embodiment 4

Figure 7:
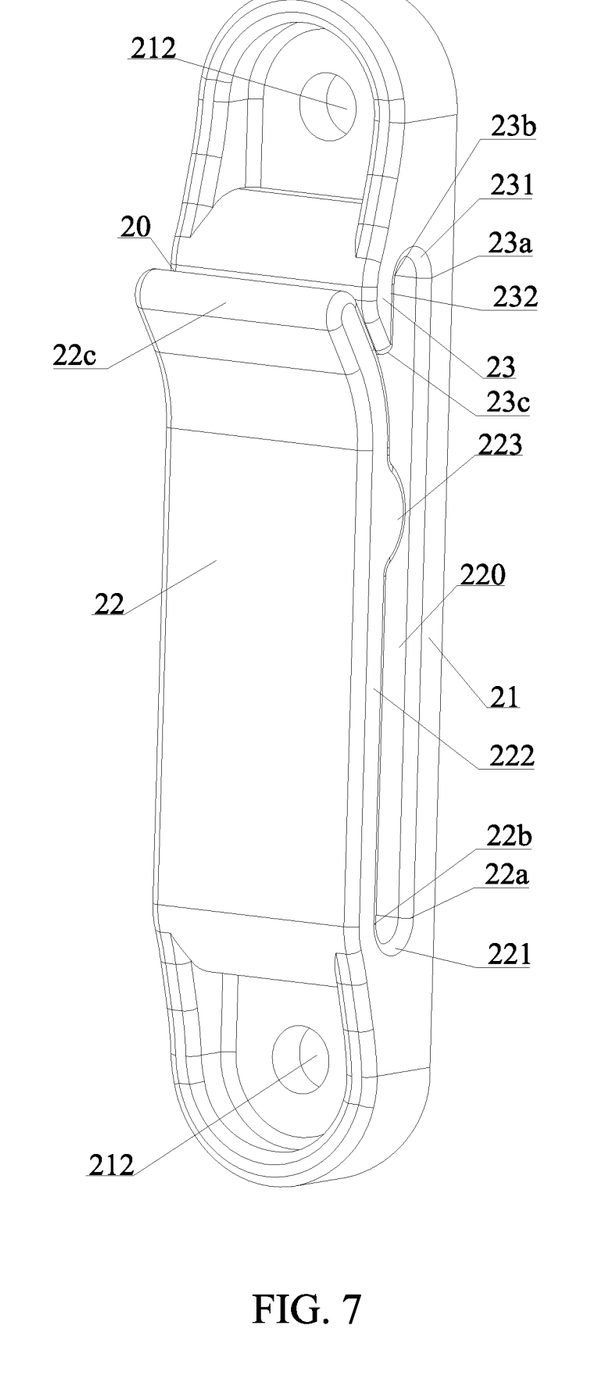
FIG. 7 is a schematic diagram of the securing mechanism according to embodiment 4 of the present disclosure.
Figure 8:
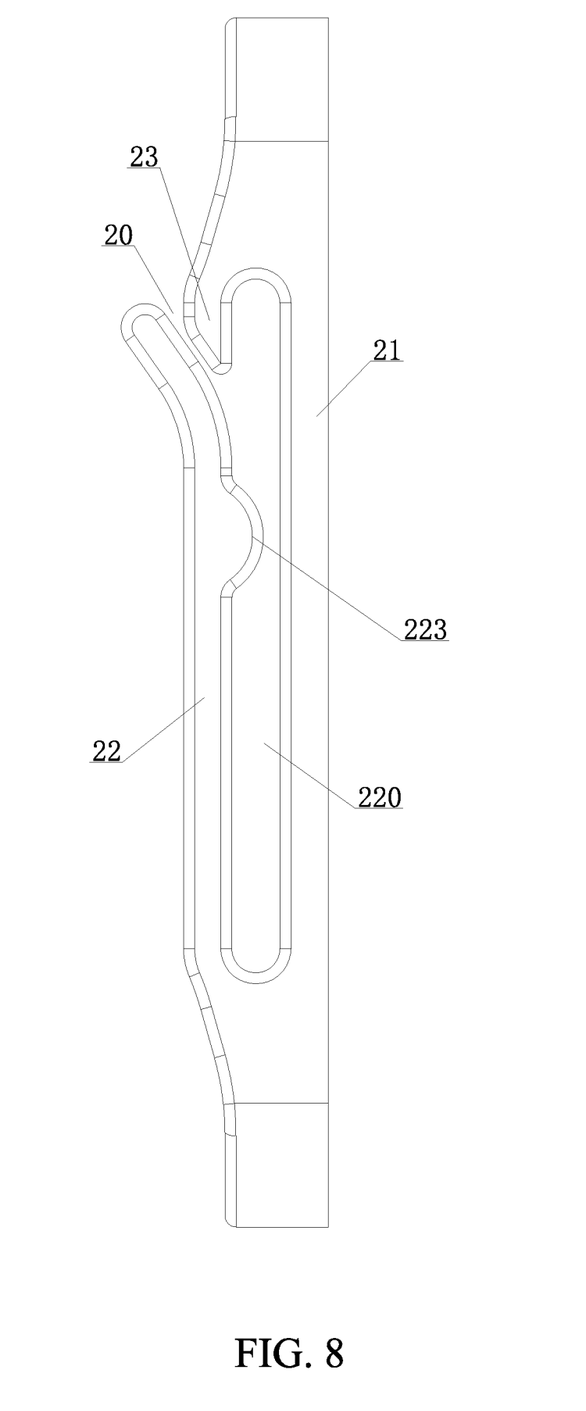
FIG. 8 is a side view of the securing mechanism shown in FIG. 7.

Referring to FIG. 7 to FIG. 8, the securing mechanism 2 for a pet loading accessory which is identical to the pet loading accessory in embodiment 1 is provided. The securing mechanism 2 includes the base 21, the first blocking portion 22, and the second blocking portion 23. The first blocking portion 22 and the second blocking portion 23 have a bending plate-like structure overall presented in a hook-like shape. The base 21 has a strip-shaped plate-like structure. The securing mechanism 2 is integrally formed by an injection molding. The first blocking portion 22 has the substantially U-shaped segment 221 and the substantially vertical segment 222 that are connected to configure the first blocking portion 22 in the hook-like shape. The front end 22*a* of the first blocking portion 22 is fixedly arranged on the base 21, the substantially U-shaped segment 221 is formed by extending outwardly from the front end 22*a* to the joint 22*b* of the first blocking portion 22, and the substantially vertical segment 222 is formed by extending from the joint 22*b* to the rear end 22*c* of the first blocking portion 22. The substantially vertical segment 222 is arranged spaced apart from the base 21. The second blocking portion 23 has the substantially U-shaped segment 231 and the substantially vertical segment 232 that are connected to configure the first blocking portion 23 in the hook-like shape. The front end 23*a* of the second blocking portion 23 is fixedly arranged on the base 21, the substantially U-shaped segment 231 is formed by extending outwardly from the front end 23*a* to the joint 23*b* of the second blocking portion 23, and the substantially vertical segment 232 is formed by extending from the joint 23*b* to the rear end 23*c* of the second blocking portion 23. The substantially vertical segment 232 is arranged spaced apart from the base 21. The rear end 22*c* of the first blocking portion 22 and the rear end 23*c* of the second blocking portion 23 are arranged in an approaching and staggered manner. The front end 22*a* of the first blocking portion 22 and the front end 23*a* of the second blocking portion 23 are located on the same side of the base 21 and are respectively adjacent to two ends along the length direction of the base 21. The securing groove 220 is formed between the first blocking portion 22, the second blocking portion 23, and the base 21.

Referring to FIG. 7 to FIG. 8, the substantially U-shaped segment 221 of the first blocking portion 22 and the substantially U-shaped segment 231 of the second blocking portion 23 are roughly parallel to each other, and the distance between the joint 22*b* and the front end 22*a* of the first blocking portion 22 is basically equal to the distance between the joint 23*b* and the front end 23*a* of the second blocking portion 23. The rear end 22*c* of the first blocking portion 22 and the rear end 23*c* of the second blocking portion 23 approach towards each other along the direction roughly parallel to the length direction of the base 21. Before the rear end 22*c* of the first blocking portion 22 and the rear end 23*c* of the second blocking portion 23 contact, at least one of the rear end 22*c* and the rear end 23*c* turns away to achieve the staggered configuration. The communication gap 20 is formed between the rear end 22*c* of the first blocking portion 22 and the rear end 23*c* of the second blocking portion 23 and communicates with the securing groove 220. The communication gap 20 can be formed by staggering the rear end 22*c* of the first blocking portion 22 and the rear end 23*c* of the second blocking portion 23 with the rear end 22*c* closer to the base 21 than the rear end 23*c* or the rear end 23*c* closer to the base 21 than the rear end 22*c*.

Referring to FIG. 7 to FIG. 8, in the present embodiment, before the rear end 22*c* of the first blocking portion 22 and the rear end 23*c* of the second blocking portion 23 contact, the rear end 22*c* turns away from the base 21. The length of the substantially vertical segment 222 of the first blocking portion 22 is greater than the length of the substantially vertical segment 232 of the second blocking portion 23. The staggered structure facilitates the entry of the roughly horizontal section of the three-point safety belt 4 into the securing groove 220 and reduces the chance of the roughly horizontal section of the three-point safety belt 4 accidentally slipping out of the securing groove 220. Furthermore, the protrusion 223 is additionally provided on the substantially vertical segment 222 of the first blocking portion 22 and set inside the securing groove 220. The protrusion 223 is a convex ridge structure protruding from the side facing the position where the base 21 is located and adjacent to the rear end 23*c* of the second blocking portion 23. The protrusion 223 helps to enhance the constraint ability of the securing groove 220 on the roughly horizontal section of the three-point safety belt 4, thereby further reducing the chance of the roughly horizontal section of the three-point safety belt 4 accidentally slipping out of the securing groove 220. In addition, since the rear end 22*c* of the first blocking portion 22 and the rear end 23*c* of the second blocking portion 23 are staggered during the injection molding process of the securing mechanism 2 in the present embodiment, the square through hole 211 in embodiment 1 is not necessary and can be omitted accordingly.

Embodiment 5

Figure 9:
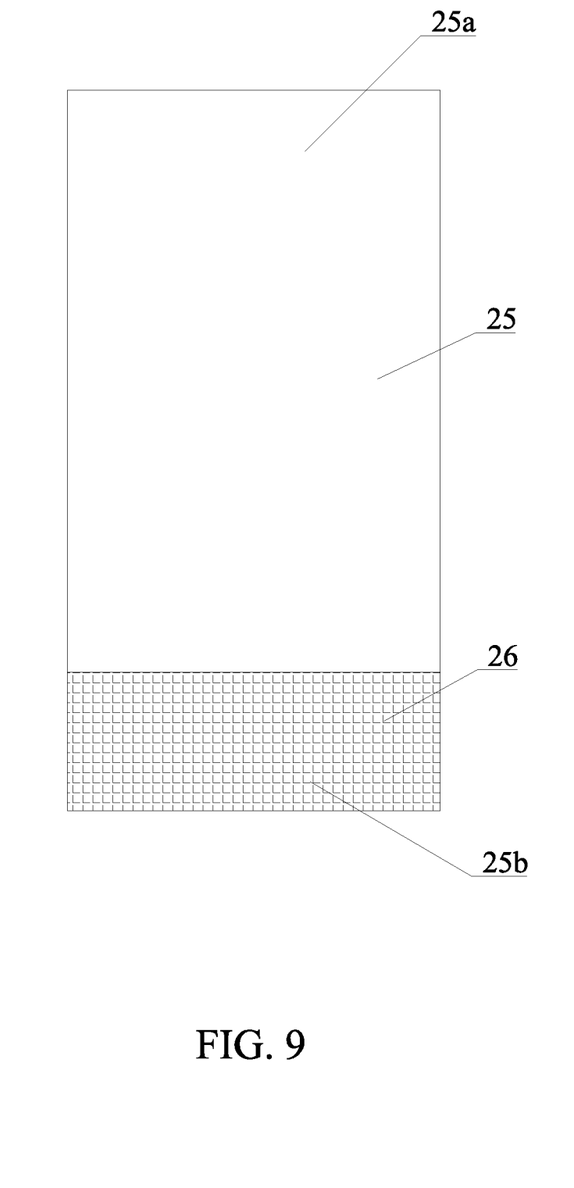
FIG. 9 is a schematic diagram of the securing mechanism according to embodiment 5 of the present disclosure.
Figure 10:
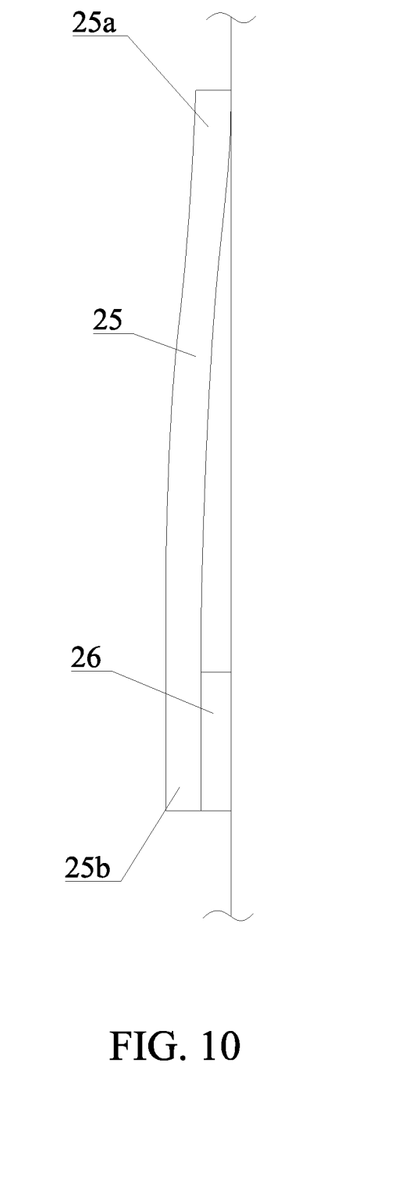
FIG. 10 is a side view of the securing mechanism shown in FIG. 9 when being assembled on a pet loading accessory.

Referring to FIG. 9 and FIG. 10, the present embodiment provides the securing mechanism for a pet loading accessory which is identical to the pet loading accessory in embodiment 1 is provided. The securing mechanism 2 includes the body 25 having the fixing end 25*a* and the movable end 25*b*. The fixing end 25*a* is fixedly connected to the pet loading accessory, and the movable end 25*b* is detachably connected to the pet loading accessory. The body 25 of the securing mechanism 2 is made of a flexible and non-elastic material. The use of flexible and non-elastic material can reduce the relative movement between the securing mechanism 2 and the safety belt 4 during use and enhance the securing effect of the securing mechanism 2 on the roughly horizontal section of the three-point safety belt 4. The fixing end 25a is fixedly connected to the pet loading accessory by an adhesive, a suture, or the like. Alternatively, the fixing end 25a is integrally formed with pet loading accessory. The movable end 25b is detachably connected to the pet loading accessory by the hook or the loop fastener 26. In this configuration, the space enclosed by the body 25 of the securing mechanism 2 and the pet loading accessory can be used to accommodate the roughly horizontal section of the three-point safety belt 4 for securing the pet loading accessory and during use the securing mechanism 2 will not prone to deforming due to non-elasticity. The movable end 25b is detachably connected to the pet loading accessory so that when the roughly horizontal section of the three-point safety belt 4 needs to be inserted into or removed from the space, the movable end 25b can be separated from the pet loading accessory by pulling the hook or the loop fastener 26, thus facilitating the operation.

Embodiment 6

Figure 11:
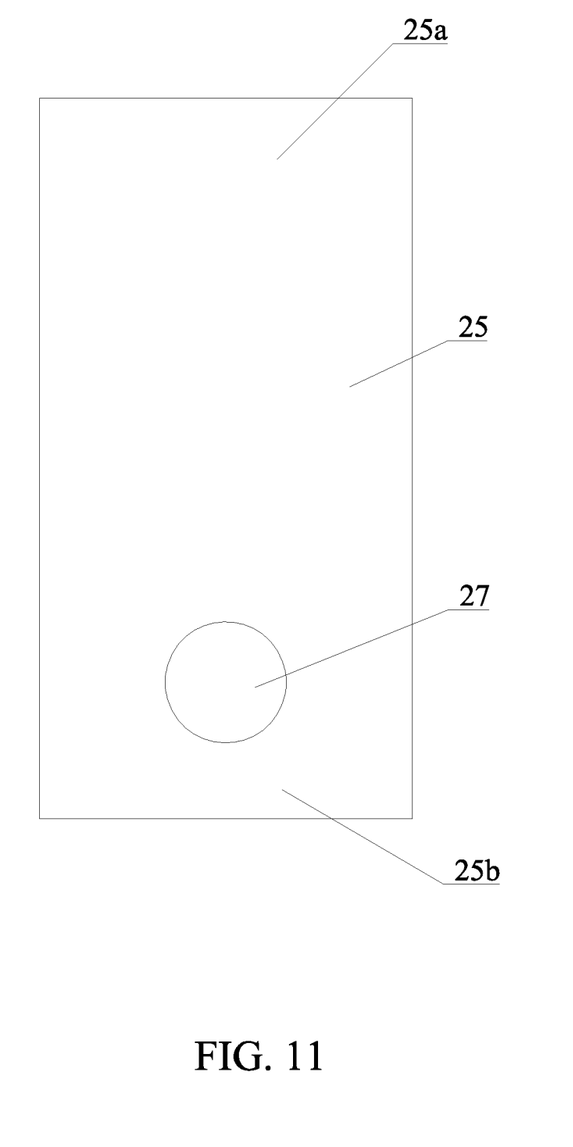
FIG. 11 is a schematic diagram of the securing mechanism according to embodiment 6 of the present disclosure.

The embodiment 6 differs from the embodiment 5 only in that the button 27 is used instead of the hook or the loop fastener 26, as shown in FIG. 11. The number of the button 27 used can be selected as needed.

The above is only specific embodiments of the present disclosure, but the implementation of the present disclosure is not limited thereto. Any modification or change made to the present disclosure without departing from the technical concept and principle of the present disclosure should be deemed as falling within the scope of protection of the present disclosure.

What is claimed is:

1. A securing mechanism for securing a pet loading accessory on a vehicle via a safety belt of the vehicle, comprising:
   a base,
   a first blocking portion, and
   a second blocking portion;
   wherein
   a rectangular through hole is provided at a center of the base, a first circular bolt hole is provided at a first end of the base, and a second circular bolt hole is provided at a second end of the base opposite to the first end; and
   the first blocking portion and the second blocking portion are both arranged in between the first circular bolt hole and the second circular bolt hole.

2. The securing mechanism according to claim 1, wherein the first blocking portion comprises a substantially horizontal segment and a substantially vertical segment, a first end of the substantially horizontal segment of the first blocking portion is fixedly connected to the base, and a second end of the substantially horizontal segment of the first blocking portion is integrally formed with a first end of the substantially vertical segment of the first blocking portion to form a first joint and configure the first blocking portion in an L-shaped bending structure;
   the second blocking portion comprises a substantially horizontal segment and a substantially vertical segment, a first end of the substantially horizontal segment of the second blocking portion is fixedly connected to the base, and a second end of the substantially horizontal segment of the second blocking portion is integrally formed with a first end of the substantially vertical segment of the second blocking portion to form a second joint and configure the second blocking portion in an L-shaped bending structure; and
   a second end of the substantially vertical segment of the first blocking portion and a second end of the substantially vertical segment of the second blocking portion are arranged apart from and opposite to each other in an approaching manner.

3. The securing mechanism accessory according to claim 2, wherein
   a securing groove is formed between the first blocking portion, the second blocking portion, and the base; and
   a communication gap communicating with the securing groove is formed between the second end of the substantially vertical segment of the first blocking portion and the second end of the substantially vertical segment of the second blocking portion.

4. The securing mechanism according to claim 2, wherein a length of the substantially vertical segment of the first blocking portion is greater than a length of the substantially vertical segment of the second blocking portion.

5. The securing mechanism according to claim 2, wherein the substantially vertical segment of the first blocking portion and the substantially vertical segment of the second blocking portion are both arranged parallel to the base.

6. The securing mechanism according to claim 1, wherein the base is further provided with two bolt holes.

7. The securing mechanism according to claim 3, wherein the second end of the substantially vertical segment of the first blocking portion is perpendicular to the substantially horizontal segment of the first blocking portion, and the second end of the substantially vertical segment of the second blocking portion is perpendicular to the substantially horizontal segment of the second blocking portion; and
   a surface of the second end of the substantially vertical segment of the first blocking portion is a rounded surface, and a surface of the second end of the substantially vertical segment of the second blocking portion is an inclined surface tilted towards the securing groove.

* * * * *